US012055132B2

(12) United States Patent
Rtimi et al.

(10) Patent No.: US 12,055,132 B2
(45) Date of Patent: Aug. 6, 2024

(54) MAGNETIC CIRCUIT FOR CREATING A MAGNETIC FIELD IN A MAIN ANNULAR IONISATION AND ACCELERATION CHANNEL OF A HALL-EFFECT PLASMA THRUSTER

(71) Applicants: INSTITUT NATIONAL POLYTECHNIQUE DE TOULOUSE, Toulouse (FR); CENTRE NATIONAL DE LA RECHERCHE SCIENTIFIQUE, Paris (FR)

(72) Inventors: Youness Rtimi, Toulouse (FR); Frédéric Messine, Toulouse (FR)

(73) Assignees: INSTITUT NATIONAL POLYTECHNIQUE DE TOULOUSE, Toulouse (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 144 days.

(21) Appl. No.: 17/926,420

(22) PCT Filed: May 18, 2021

(86) PCT No.: PCT/EP2021/063128
§ 371 (c)(1),
(2) Date: Nov. 18, 2022

(87) PCT Pub. No.: WO2021/233909
PCT Pub. Date: Nov. 25, 2021

(65) Prior Publication Data

US 2023/0193883 A1 Jun. 22, 2023

(30) Foreign Application Priority Data

May 19, 2020 (FR) ...................................... 2005030

(51) Int. Cl.
*F03H 1/00* (2006.01)
*H01F 7/02* (2006.01)

(52) U.S. Cl.
CPC ......... *F03H 1/0075* (2013.01); *H01F 7/0278* (2013.01)

(58) Field of Classification Search
CPC .... F03H 1/0075; F03H 1/0012; F03H 1/0037; F03H 1/0068; F03H 1/00; F03H 3/00
See application file for complete search history.

(56) References Cited

U.S. PATENT DOCUMENTS 6,373,162 B1 * 4/2002 Liang ..................... H02K 21/24 310/156.53
2005/0035731 A1 * 2/2005 Secheresse .............. H05H 1/54 315/506

(Continued)

FOREIGN PATENT DOCUMENTS

CN 107 725 296 A 2/2018
FR 2 857 555 A1 1/2005
FR 2 919 755 A1 2/2009

*Primary Examiner* — Wei (Victor) Y Chan
(74) *Attorney, Agent, or Firm* — BakerHostetler

(57) ABSTRACT

A magnetic circuit for creating a magnetic field in a main annular ionization and acceleration channel of a Hall-effect plasma thruster, having an open top end for emitting ions and a closed bottom end, includes outer magnets comprising a bottom annular outer magnet, and a top annular outer magnet disposed above the bottom outer magnet; inner magnets comprising a bottom inner magnet, of cylindrical form having a bottom part of a diameter less than the diameter of a top part, disposed below the top outer magnet, and a top annular inner magnet disposed above the bottom inner magnet; the outer magnets having a same pole (N, S) on their respective top face and an opposite same pole (S, N) on their bottom face; the inner magnets having an orientation of their poles that is the reverse of that of the outer (Continued)

magnets; and the outer magnets and the inner magnets being disposed above the closed bottom end of the annular channel.

14 Claims, 4 Drawing Sheets

(56) References Cited

U.S. PATENT DOCUMENTS

| | | | | |
|---|---|---|---|---|
| 2015/0128560 | A1 | 5/2015 | Conversano et al. | |
| 2019/0168895 | A1* | 6/2019 | Conversano .......... | F03H 1/0075 |
| 2020/0112793 | A1* | 4/2020 | Børresen ................. | H01F 27/28 |

* cited by examiner

MAGNETIC CIRCUIT FOR CREATING A MAGNETIC FIELD IN A MAIN ANNULAR IONISATION AND ACCELERATION CHANNEL OF A HALL-EFFECT PLASMA THRUSTER

CROSS-REFERENCE TO RELATED APPLICATIONS

This application is a National Stage of International patent application PCT/EP2021/063128, filed on May 18, 2021, which claims priority to foreign French patent application No. FR 2005030, filed on May 19, 2020, the disclosures of which are incorporated by reference in their entirety.

FIELD OF THE INVENTION

The invention relates to a magnetic circuit for creating a magnetic field in a main annular ionization and acceleration channel of a Hall-effect plasma thruster.

BACKGROUND

Hall-effect thrusters, with the acronym HET, or ion thrusters use an electrical field to accelerate the ions and require a magnetic field generated conventionally by coils to generate the magnetic field that makes it possible to trap the electrons that are used to ionize a gas. These ions are then accelerated and produce a thrust.

The purpose of the magnetic field is to form a zone of very high electron concentration (it imprisons the electrons generated by the cathode) to allow the neutral atoms of the gas to be ionized. The purpose of the electrical field is to accelerate the ions out of the channel. This acceleration generates the thrust. The magnetic field plays a crucial role and its form impacts the propulsive performance and the erosion of the thruster.

As illustrated in FIG. 1, the main components of a Hall-effect thruster are: the magnetic circuit, the plasma channel, the anode (placed at the bottom of the plasma channel with the gas injector) and the cathode (placed outside the plasma channel). Hall-effect thrusters, as illustrated in FIG. 2 or described for example in the document US 2015/0128560 A1, are known in which the magnetic circuit comprises coils or solenoids or “selfs”, that make it possible to create the necessary magnetic field.

FIG. 3 schematically represents the topology of the field lines of a thruster of FIG. 2.

Studies on the topology of a coil are empirical and are conducted by progressive trial and error, with a few mathematical tools that are sufficient to guarantee satisfactory performance. However, the current needs require engines with a longer lifetime.

For this, the magnetic field must have very specific field lines because the ions must not strike the walls, and thus must avoid the erosion of the ceramics. For this, the magnetic field must meet a criterion in addition to the two conventional criteria. This criterion is called magnetic shielding criterion and consists in that, at the edges of the channel (against the ceramic walls), the radial component Br of the field must be as low as possible. The other two so-called conventional field criteria consist in having the component Bz of the magnetic field zero along the longitudinal axis of the magnetic circuit and the amplitude of the radial component Br of the field B must follow a gaussian curve, as represented in FIGS. 2 and 3. The field constraints are therefore as follows: in the output plane, the axial component Bz of the magnetic field along the longitudinal axis of the magnetic circuit must be zero, and, on the top edges of the annular channel, the radial component Br of the magnetic field must be as low as possible. It is therefore necessary to act on the intensity of the current in the coils, on its form and on the form of the magnetic circuit.

Given, on the one hand, the thermal and compactness constraints imposed by the nature of the coils and, on the other hand, the increasing requirements on the mapping of the magnetic field considered as optimal for the propulsion, the use of the coils is becoming very limiting in terms of performance, and all the more so for the Hall-effect thrusters of low powers. Since the coils are energy consumers, the range of such a magnetic circuit for creating a magnetic field in a main annular ionization and acceleration channel of a Hall-effect plasma thruster is limited.

SUMMARY OF THE INVENTION

One aim of the invention is to mitigate the abovementioned problems, and notably enhance the range of such a magnetic circuit.

So, according to one aspect of the invention, a magnetic circuit is proposed for creating a magnetic field in a main annular ionization and acceleration channel of a single-stage Hall-effect plasma thruster, having an open top end for emitting ions and a closed bottom end, comprising:

- a magnetic base;
- a first support intended to receive outer magnets disposed outside of the outer wall of the annular channel;
- a second support intended to receive inner magnets disposed outside of the inner wall of the annular channel;
- the outer magnets comprising a bottom annular outer magnet, and a top annular outer magnet disposed above the bottom outer magnet;
- the inner magnets comprising a bottom inner magnet, of cylindrical form having a bottom part of a diameter less than the diameter of a top part, disposed below the top outer magnet, and a top annular inner magnet disposed above the bottom inner magnet;
- the outer magnets having a same pole on their respective top face and an opposite same pole on their bottom face;
- the inner magnets having an orientation of their poles that is the reverse of that of the outer magnets;
- the outer magnets and the inner magnets being disposed above the closed bottom of the annular channel.

Thus, the use of magnets instead of coils substantially increases the range of the Hall-effect plasma thruster. The use of magnets makes it possible to achieve the desired field levels (magnetic field intensity) while being compact and without imposing thermal constraints. Furthermore, the particular disposition of the magnets offers greater flexibility, such that the magnetic shielding criterion can be fulfilled in addition to the conventional criteria, because all these criteria are of contradictory nature and therefore particularly difficult to be met all together, above all for a small engine of low power.

Furthermore, this magnetic shielding enhances the efficiency and the lifetime of a Hall-effect thruster by reducing the erosion of the walls of the channel. By satisfying all the criteria with the disposition of the magnets illustrated in FIG. 4, a low-power thruster is obtained with greater performance levels and a longer lifetime.

This field topology is reflected by very specific field lines which avoid having the ions strike the walls of the channel and erode the thruster. The field lines are deep and in the output plane, the axial component Bz is zero and, on the edges of the ceramic, the radial component Br is low, as illustrated in FIG. 3.

According to one embodiment, the bottom outer magnet has a section two times greater than the section of the top outer magnet.

The top outer magnet is closer to the output plane and the ceramic channel than the bottom outer magnet.

The bottom outer magnet contributes to increasing the level of the field at the output plane, and the top outer magnet makes it possible to deflect the field lines with a loop back effect, thus creating a magnetic field of low radial component in proximity to the ceramic walls.

In one embodiment, the bottom outer magnet has an average diameter of between 6 mm and 7 mm.

According to one embodiment, the bottom outer magnet has a height twice the height of the top outer magnet.

In one embodiment, the width of the top outer magnet is equal to the width of the bottom outer magnet.

According to one embodiment, the bottom inner magnet has a height twice the height of the bottom outer magnet.

The bottom inner magnet contributes to increasing the level of the field at the output plane, and the top inner magnet makes it possible to deflect the field lines with a loop back effect, thus creating a magnetic field of low radial component in proximity to the ceramic walls.

In one embodiment, the height of the bottom part of the bottom inner magnet is 1.5 times greater than the height of the top part of the bottom inner magnet.

According to one embodiment, the outer diameter of the top inner magnet is twice the diameter of the top part of the bottom inner magnet.

The top inner magnet is closer to the output plane and the ceramic channel than the bottom inner magnet.

Being close to the output plane and the ceramic channel, the top inner magnet, by magnetic field loop back effect, reduces the radial component of the field and thus creates the magnetic shielding effect on the internal side of the plasma channel.

In one embodiment, the inner diameter of the top inner magnet is between 1.2 and 1.3 times the diameter of the top part of the bottom inner magnet (5).

According to one embodiment, the first and second supports are made of copper.

In one embodiment, the magnetic circuit comprises an additional annular magnet disposed outside of the outer wall of the annular channel below the bottom outer magnet.

According to one embodiment, the magnetic circuit comprises a third support intended to receive the additional magnet.

In one embodiment, the additional magnet has a constant inner diameter and an outer diameter comprising a first, bottom part having a first diameter, a second, medium part having a second diameter greater than the first diameter, and a third, top part having a third diameter between the first and second diameters.

According to another aspect of the invention, also proposed is a Hall-effect plasma thruster comprising a magnetic circuit as previously described.

BRIEF DESCRIPTION OF THE DRAWINGS

The invention will be better understood on studying a few embodiments described as nonlimiting examples and illustrated by the attached drawings in which the figures.

In all the figures, the elements that have the same references are similar.

DETAILED DESCRIPTION

Figure 1:
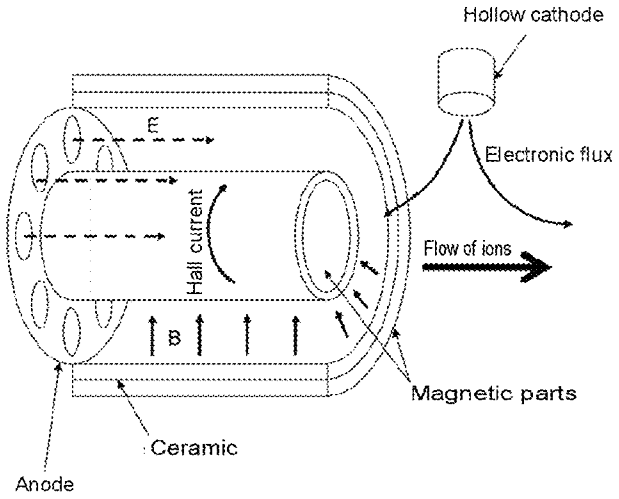
FIG. 1 schematically illustrates the main components of a Hall-effect thruster, according to the state of the art.
Figure 2:
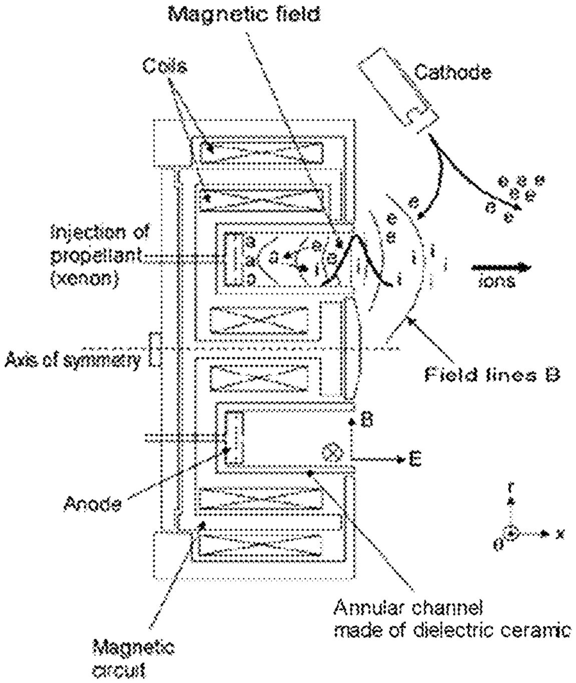
FIG. 2 schematically illustrates a Hall-effect thruster in which the magnetic circuit comprises coils, according to the state of the art.
Figure 3:
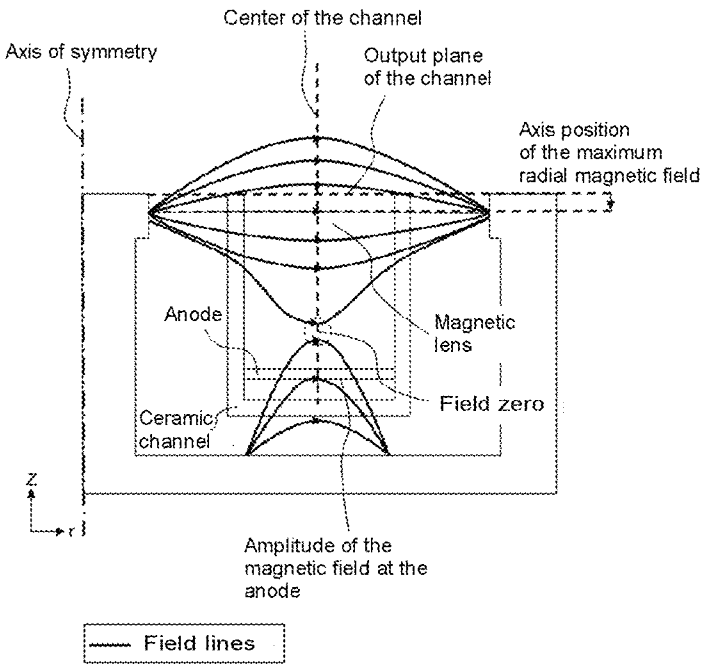
FIG. 3 schematically illustrates the magnetic field lines of a Hall-effect thruster of FIG. 2, according to the state of the art.
Figure 4:
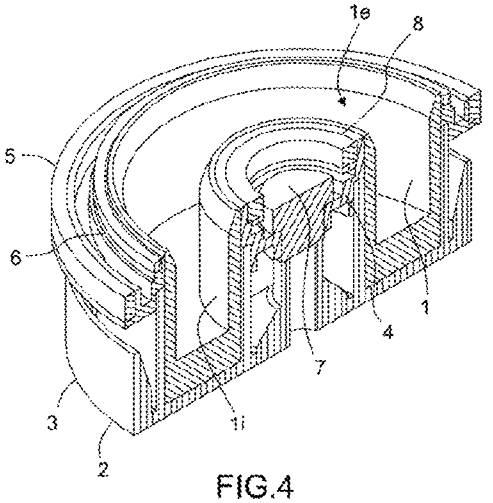
FIG. 4 schematically illustrates a magnetic circuit for creating a magnetic field in a main annular ionization and acceleration channel of a Hall-effect plasma thruster, according to an aspect of the invention.
Figure 5:
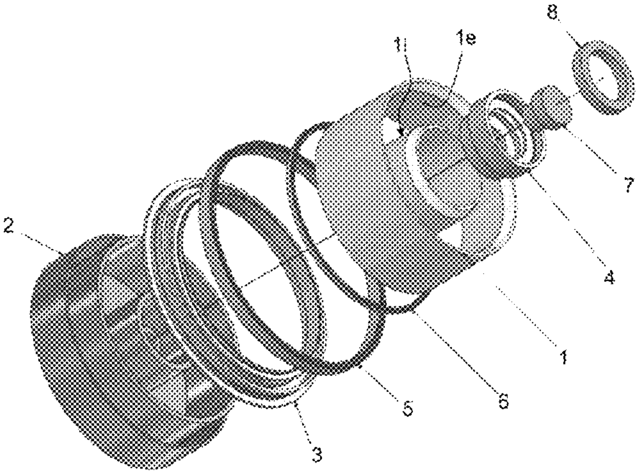
FIG. 5 schematically illustrates an exploded view of the magnetic circuit of FIG. 3, according to an aspect of the invention.

FIGS. 4 and 5 represent a partial cross-section of a magnetic circuit for creating a magnetic field in a main annular ionization and acceleration channel of a Hall-effect plasma thruster, according to an aspect of the invention.

The magnetic circuit for creating a magnetic field in a main annular ionization and acceleration channel 1 of a Hall-effect plasma thruster, having an open top end for emitting ions.

The magnetic circuit comprises a magnetic base 2, a first support 3 intended to receive outer magnets disposed outside of the outer wall 1*e* of the annular channel 1, having an open top end and a closed bottom end, and a second support 4 intended to receive inner magnets disposed outside of the inner wall 1*i* of the annular channel 1.

The outer magnets comprise a bottom annular outer magnet 5, and a top annular outer magnet 6 disposed above the bottom outer magnet 5.

The inner magnets comprising a bottom inner magnet 7, of cylindrical form having a bottom part of a diameter less than the diameter of a top part, disposed below the top outer magnet 6, and a top annular inner magnet 8 disposed above the bottom inner magnet 7.

The outer magnets 5, 6 have a same pole (for example N, S) on their respective top face and an opposite same pole (in this example S, N) on their bottom face, and the inner magnets 7, 8 have an orientation of their poles that is the reverse of that of the outer magnets 5, 6.

The outer magnets 5, 6 and the inner magnets 7, 8 are disposed above the closed bottom end of the annular channel 1.

The permanent magnets prevent the magnetic field lines from crossing with the walls of the discharge channel 1 in the acceleration zone while allowing them to follow the walls towards the anode.

The bottom outer magnet 5 can have a section two times greater than the section of the top outer magnet 6, and its average diameter can be between 6 mm and 7 mm. The bottom outer magnet 5 has a height twice the height of the top outer magnet.

The width of the top outer magnet 6 can be equal to the width of the bottom outer magnet 5.

The bottom inner magnet 7 can have a height twice the height of the bottom outer magnet 5.

The height of the bottom part of the bottom inner magnet 7 can be 1.5 times greater than the height of the top part of the bottom inner magnet 7.

The outer diameter of the top inner magnet 8 can be twice the diameter of the top part of the bottom inner magnet 7.

The inner diameter of the top inner magnet 6 can be between 1.2 and 1.3 times the diameter of the top part of the bottom inner magnet 5.

The first and second supports 3, 4 can be made of copper.

Figure 6:
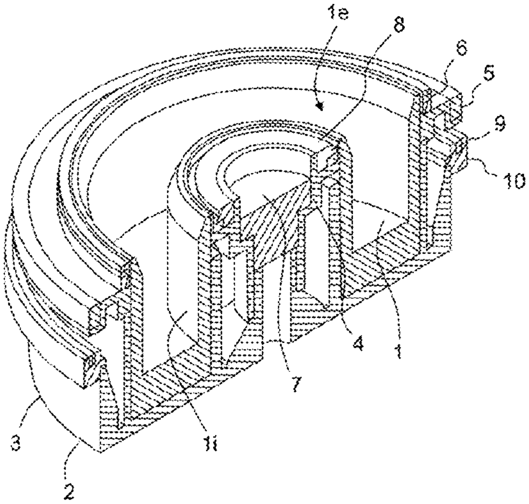
FIG. 6 schematically illustrates magnetic for creating a magnetic field in a main annular ionization and acceleration channel of a Hall-effect plasma thruster, according to another aspect of the invention.

As illustrated in FIG. 6, an additional annular magnet 9 can be disposed outside of the outer wall 1*e* of the annular channel 1 below the bottom outer magnet 5, and a third support 10 can be intended to receive the additional magnet 9.

The additional magnet 9 can have a constant inner diameter and an outer diameter comprising a first, bottom part having a first diameter, a second, medium part having a second diameter greater than the first diameter, and a third, top part having a third diameter between the first and second diameters.

Figure 7:
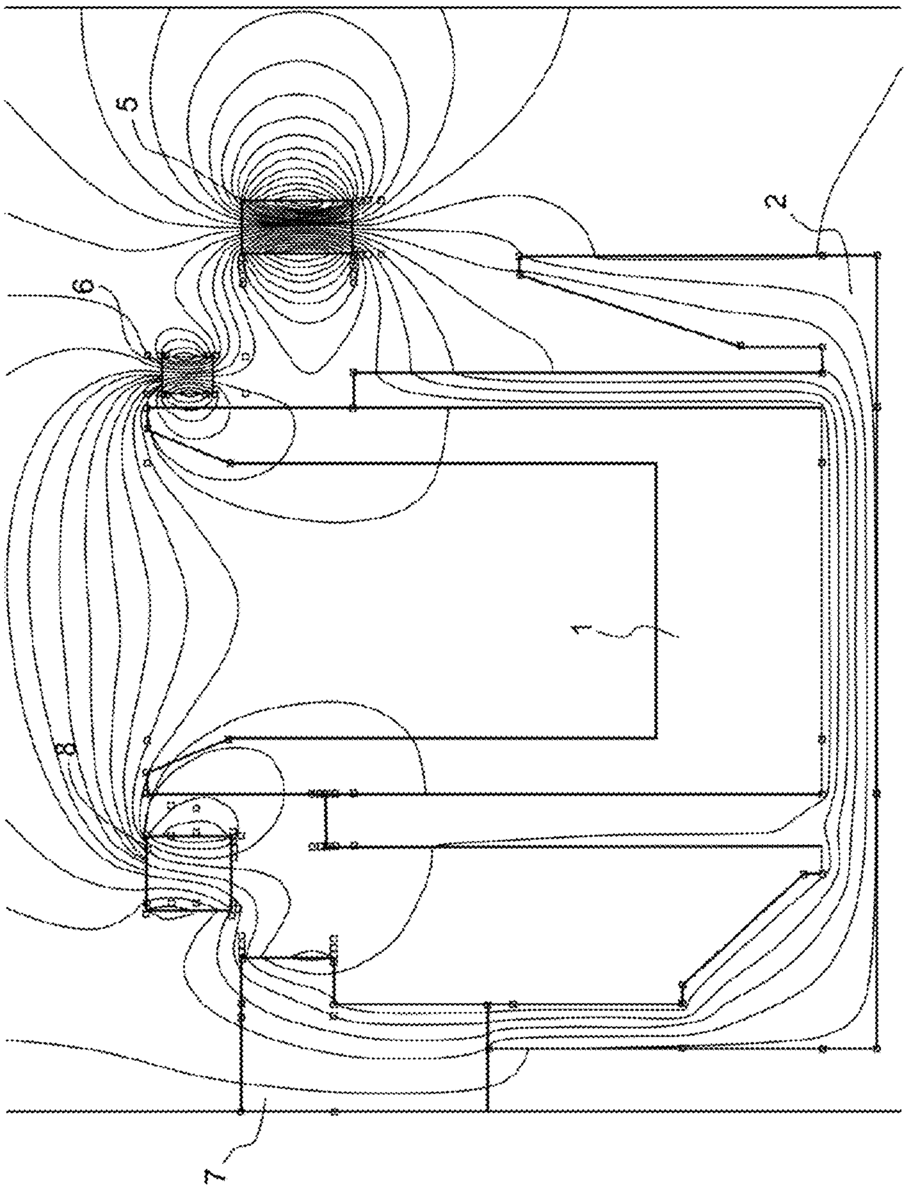
FIG. 7 schematically illustrates the magnetic field lines of a Hall-effect thruster, according to an aspect of the invention.

FIG. 7 schematically illustrates the magnetic field lines of a Hall-effect thruster, according to an aspect of the invention.

The present invention therefore makes it possible to have Hall-effect plasma thrusters comprising a magnetic circuit as previously described.

The Invention claimed is:

1. A magnetic circuit for creating a magnetic field in a main annular ionization and acceleration channel of a single-stage Hall-effect plasma thruster, having an open top end for emitting ions and a closed bottom end, comprising:

a magnetic base;

a first support intended to receive outer magnets disposed outside of the outer wall of the annular channel;

a second support intended to receive inner magnets disposed outside of the inner wall of the annular channel;

the outer magnets comprising a bottom annular outer magnet, and a top annular outer magnet disposed above the bottom outer magnet;

the inner magnets comprising a bottom inner magnet, of cylindrical form having a bottom part of a diameter less than the diameter of a top part, disposed below the top outer magnet, and a top annular inner magnet disposed above the bottom inner magnet;

the outer magnets having a same pole on their respective top face and an opposite same pole on their bottom face;

the inner magnets having an orientation of their poles that is the reverse of that of the outer magnets; and the outer magnets and the inner magnets being disposed above the closed bottom end of the annular channel.

2. The magnetic circuit as claimed in claim 1, wherein the bottom outer magnet has of a section two times greater than the section of the top outer magnet.

3. The magnetic circuit as claimed in claim 1, wherein the bottom outer magnet has an average diameter of between 6 mm and 7 mm.

4. The magnetic circuit as claimed in claim 1, wherein the bottom outer magnet has a height twice the height of the top outer magnet.

5. The magnetic circuit as claimed in claim 1, wherein the width of the top outer magnet is equal to the width of the bottom outer magnet.

6. The magnetic circuit as claimed in claim 1, wherein the bottom inner magnet has a height twice the height of the bottom outer magnet.

7. The magnetic circuit as claimed in claim 1, wherein the height of the bottom part of the bottom inner magnet is 1.5 times greater than the height of the top part of the bottom inner magnet.

8. The magnetic circuit as claimed in claim 1, wherein the outer diameter of the top inner magnet is twice the diameter of the top part of the bottom inner magnet.

9. The magnetic circuit as claimed in claim 1, wherein the inner diameter of the top inner magnet is between 1.2 and 1.3 times the diameter of the top part of the bottom inner magnet.

10. The magnetic circuit as claimed in claim 1, wherein the first and second supports are made of copper.

11. The magnetic circuit as claimed in claim 1, comprising an additional annular magnet disposed outside of the outer wall of the annular channel below the bottom outer magnet.

12. The magnetic circuit as claimed in claim 11, comprising a third support intended to receive the additional magnet.

13. The magnetic circuit as claimed in claim 11, wherein the additional magnet has a constant inner diameter and an outer diameter comprising a first, bottom part having a first diameter, a second, medium part having a second diameter greater than the first diameter, and a third, top part having a third diameter between the first and second diameters.

14. A Hall-effect plasma thruster comprising a magnetic circuit according to claim 1.

* * * * *